United States Patent [19]

Maze

[11] Patent Number: 4,573,080

[45] Date of Patent: Feb. 25, 1986

[54] PROGRESSIVE SCAN TELEVISION RECEIVER WITH ADAPTIVE MEMORY ADDRESSING

[75] Inventor: Kenneth W. Maze, Indianapolis, Ind.

[73] Assignee: RCA Corporation, Princeton, N.J.

[21] Appl. No.: 625,780

[22] Filed: Jun. 28, 1984

[51] Int. Cl.⁴ .......................... H04N 5/68; H04N 5/91
[52] U.S. Cl. ..................... 358/140; 358/148; 358/152; 358/160; 358/242
[58] Field of Search ............... 358/140, 148, 152, 160, 358/134, 166, 242, 11, 21 R

[56] References Cited

U.S. PATENT DOCUMENTS

| | | | |
|---|---|---|---|
| 4,249,198 | 2/1981 | Ito et al. | 358/13 |
| 4,364,090 | 12/1982 | Wendland | 358/140 |
| 4,400,719 | 8/1983 | Powers | 358/21 R |
| 4,415,931 | 11/1983 | Dischert | 358/242 |
| 4,443,821 | 4/1984 | Kato | 358/326 |
| 4,467,357 | 8/1984 | Cantou | 358/148 |

Primary Examiner—Howard W. Britton
Attorney, Agent, or Firm—P. J. Rasmussen; P. M. Emanuel; R. G. Coalter

[57] ABSTRACT

A video input signal is stored in a memory and read twice during a line-interval to provide a processed video output signal having a doubled line rate for display on a display device having a doubled horizontal sweep rate thereby providing a progressively scanned image having reduced visibility of line structure. The last address written in memory is used to control the starting time of the second memory read operation. This reduces the tendency of visible artifacts to occur in cases where the video input signal is "non-standard" in the sense that the ratio of the color subcarrier frequency with respect to the line rate is such that the number of color subcarrier cycles per line may be subject to variation.

5 Claims, 3 Drawing Figures

PROGRESSIVE SCAN TELEVISION RECEIVER WITH ADAPTIVE MEMORY ADDRESSING

FIELD OF THE INVENTION

This invention relates to television receivers and particularly to receivers of the type employing "progressive scanning" to effectively increase the vertical resolution of displayed images.

BACKGROUND OF THE INVENTION

"Progressively" scanned ("pro-scan") television receivers have been proposed wherein the horizontal scan rate is multiplied, e.g., doubled, and each line of video is displayed twice thereby providing a displayed image having reduced visibility of line structure and subjectively improved vertical resolution. In a typical progressively scanned receiver, each line of video is stored in one of two memories. As one of the memories is being written with the incoming video signal at the standard line rate, the other memory is read two times at twice the standard line rate thereby providing two lines of time compressed video within one standard line interval. The memory output is applied to a display having a doubled horizontal sweep rate synchronized with readout of the memory thereby doubling the number of displayed lines of video signal.

When implementing a progressively scanned receiver with digital processing circuits, one may employ random access memory (RAM) to store line information. Digital signal processing systems typically utilize a coherent clock for purposes of signal sampling, memory address control and other functions. For simplicity of chroma processing, the clock is typically phase locked to an integer multiple of the color subcarrier frequency. For NTSC standard video signals, the clock frequency is often selected to be four times that of the color subcarrier (4 fsc) or about 14.3 MHz with a period of about 70 nanoseconds. One line of memory, for this clock frequency and the standard NTSC line period of about 63.5 microseconds, therefore requires 910 locations of a RAM to store 910 video samples or "pixels" (picture elements). This memory requirement is invariant for standard NTSC signals because under the NTSC standard there are exactly 227.5 color subcarrier cycles per horizontal line. With a digital-to-analog (D/A) conversion done at four times the color subcarrier frequency (4 fsc) there are thus, exactly 910 (4×227.5) pixels per line. As long as the memory read clock is exactly double the frequency of the write clock, the resultant "double-speed" or "time-compressed" pixels will have proper horizontal spacing and vertical alignment when displayed.

SUMMARY OF THE INVENTION

It is recognized herein that a subtle problem exists in pro-scan systems of the type described when displaying what will be referred to hereinafter as non-standard video signals. As used herein, the term non-standard refers to video signals wherein the ratio of the color subcarrier frequency to horizontal line frequency does not conform exactly to a specified broadcasting standard standard (e.g., 227.5 in the NTSC standard). Where, for example, the video source is a video disc player, a video cassette recorder, a video "game" unit or some source other than broadcast television, the burst/line-frequency ratio may differ substantially from the standard ratio. Under these conditions, the number of video samples (picture elements or "pixels") in a horizontal line period will not, in general, be 910 (assuming a 4 $f_{sc}$ write clock).

The deviation of the number of samples (pixels) per line from the standard (910) is difficult to deal with because it represents a precession of the A/D converter sampling signal clock phase with respect to the incoming horizontal synchronizing signal phase. The effect of this precession, "phase-slip" or "skew" is that horizontal timing errors accumulate throughout each field. Moreover, in a progressive scan system, where a coherent 8 fsc read clock is used with double (2H) standard rate deflection for the display, the 8 fsc read clock precession relative to the 2H deflection will be double that of the 4 fsc (write) clock precession relative to the 1H incoming video signal. This problem is unique to progressive scan systems and can cause accumulated horizontal timing errors, or full-pixel timing discontinuities between lines. The visible effects may be seen as picture skew, ragged edges or other undesirable artifacts.

In view of the foregoing, one might consider preprocessing the video signal prior to "speed-up" in the progressive scan processor (PSP) with a conventional time-base corrector (TBC). Examples of time-base correctors suitable for use with video tape recorder (VTR) reproduced signal are given in U.S. Pat. Nos. 4,249,198 of Ito et al., and 4,443,821 of Kato. In Ito et al. a digitized video signal provided by an un-synchronized VTR is stored in the TBC memory (one field) and the storage locations as well as delay prior to storage of the digital samples of the video signal are controlled in response to the phase difference between the incoming video synchronizing signal components and a constant reference signal (e.g., "house synch"). The TBC of Kato is specifically addressed to correcting intra-line velocity errors of a VTR reproduced signal and includes a velocity error detector for detecting velocity errors in successive lines of the video signal written into memory. A sample level compensator at the output of the TBC memory adjusts the level of the video samples (pixels) read out from the memory as a function of the detected velocity error such that the level of the read out sample is modified to be equal to the level that the read-out sample should have had at the time it was read out if there had been no velocity error.

It is recognized herein that the use of conventional time-base correctors will not solve the unique problems encountered in progressively scanned ("pro-scan" hereinafter) video display systems. The problem in progressive scan systems involves more than time-base errors (e.g., "jitter"), it involves non-standard signals wherein there may be a variation of the number of pixels per line and this variation is effectively multiplied by the double reading of each line which occurs only in pro-scan systems. This problem does not exist in conventional time-base correctors because there each line is read only once.

Simply stated, in a progressively scanned display system, the number of pixels to be stored in the video "speed-up" memory during a memory write operation may vary for different sources and there may even be variations during a program provided by a single source. This can lead to a problem with regard to the second memory read operation under certain circumstances. As an example, assume that the memory address generator is clocked at 4 times the color subcarrier frequency (4 $f_{sc}$) and that the video signal is "non-standard" having, say, 227 rather than 227.5 color subcarrier cycles per line. Under these conditions 908 pixels will be stored in the memory during a write operation. If the memory address generator is programmed to reset for the second memory read operation at the NTSC standard (910 pixels, addresses 000–909) then the start of the second memory read operation for the 908 pixel line will begin two pixels late at address 910. A similar problem exists where the color subcarrier frequency is too high except that the memory read operation will start too early rather than being late.

The present invention resides in part in the recognition that "fixed" or constant modulo memory addressing in a progressively scanned system can lead to undesirable visual artifacts (ragged edges, etc.) for "non-standard" signals as hereinbefore defined. A progressive scan video processor embodying the invention includes a memory means for storing a video input signal supplied thereto during a first line interval and for recovering the stored signal N-times during a subsequent line interval to provide a processed video output signal having a line rate N-times that of said video input signal. An address generator means is provided for supplying read and write addresses to the memory means. A circuit means, coupled to the address generator means, stores the last address written in the memory means during a memory write operation and controls the starting time of at least one subsequent memory read operation in accordance with the stored address.

BRIEF DESCRIPTION OF THE DRAWING

The invention is illustrated in the accompanying drawing wherein like elements are identified by like reference designators, and in which.

DETAILED DESCRIPTION

Figure 1:
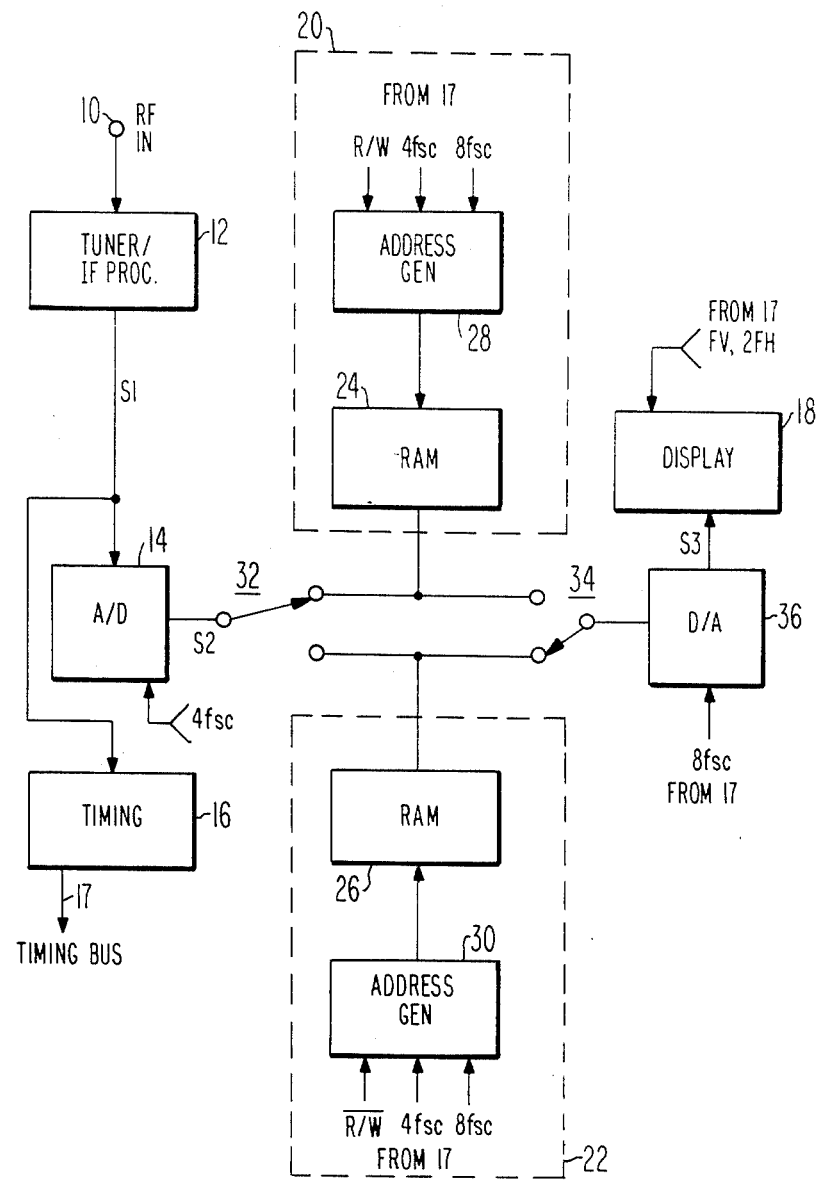
FIG. 1 is a block diagram of a progressive scan television receiver embodying the invention.

The receiver of FIG. 1 includes an input terminal 10 for connection to a source of television signals. When connected to an antenna for receiving standard broadcast signals, the received signal will conform to a standard (NTSC, for example) wherein the number of color subcarrier cycles per horizontal line is known exactly (e.g., 227.5). When connected to another source, such as a "consumer" disc or tape recorder, the color subcarrier/line frequency ratio may differ from the exact broadcast standard as previously discussed and this difference may tend to result in various visible artifacts being displayed if not compensated for as described hereinafter.

Terminal 10 is connected to a tuner/IF processing unit 12 of conventional design to provide a baseband video output signal S1. (For video "MONITOR" applications, tuner 12 may be omitted or bypassed by means of a switch). The baseband video signal S1 is applied to an analog-to-digital (A/D) converter 14 and to a timing unit 16. Unit 16 includes conventional sync and burst detectors and multiplying phase locked loops to generate a plurality of timing signals including memory read and write clocks phase-locked to eight and four times the color subcarrier frequency, respectively, (8 $f_{sc}$, 4 $f_{sc}$). Half line rate signals (FH/2) are provided for controlling memory read/write (R/W) selection and double line rate signals (2 FH) are provided for timing the horizontal sweep of the receiver display 18. The timing signals are distributed to the various elements of the receiver by means of timing bus 17.

Converter 14 is coupled to receive the 4 fsc clock signal provided by timing unit 16 and samples the video signal S1 at that rate. The sampled signal is digitized in converter 14 to provide a parallel digital video output signal S2 of 8-bit resolution. To simplify the drawing, each digital data bus (8 bits) or address bus (10 bits) is drawn as a single line and each data bus multiplex switch is shown in simplified form (i.e., an eight-pole bus switch is represented by a one-pole switch).

The number of lines of the digitized video signal (S2) provided by A/D converter 14 is doubled for application to display 18 by means of a pair of progressive scan processors (PSP) 20 and 22 (outlined in phantom) each comprising a respective random access memory (RAM) 24, 26 coupled to a respective address generator 28, 30 for receiving read and write addresses therefrom. Alternate lines of the digitized video signal S2 are applied to respective ones of memories 24 and 26 by means of a switch 32 that is controlled by a half line-rate (FH/2) read/write (R/W) timing signal provided by timing unit 16. For purposes of discussion it will be assumed that switch 32 is in the position shown (upward) for even lines of the video signal S1 for storing (writing) signal S2 in RAM 24 and that switch 32 is in the opposite position during odd lines of signal S1 for writing signal S2 in RAM 26.

The data "ports" or terminals of memories 24 and 26 are bidirectional, that is, during a memory write operation they serve as inputs and during a memory read operation they serve as outputs. The data terminals of memories 24 and 28 are coupled to a digital-to-analog (D/A) converter 36 via a further switch 34. During even lines of signal S1, switch 34 (in the position shown) couples the output of RAM 26 to converter 36 and during odd lines it couples the output of RAM 24 to converter 36. Converter 36 receives 8 $f_{sc}$ clock signals from timing unit 16 (via bus 17) and provides a processed video output signal S3 for display on unit 18. Display unit 18 is supplied with normal field-rate (FV) and doubled line-rate (2 FH) signals from unit 16 for providing a progressively scanned image of the double line-rate signal S3. Unit 18 may comprise a conventional kinescope or a projection unit and associated drive circuitry.

With the exception of the RAM address processing, as will be described, overall operation of the progressively scanned receiver is conventional. Briefly, the digitized video signal S2 is alternately stored in the memories 24 and 26. As one line is being written into memory 24, the previously stored line in memory 26 is read twice, converted back to analog form in converter 36 and then displayed on display 16 (e.g., a kinescope or projection display) which has a doubled horizontal sweep rate (2 FH) thereby displaying two lines of video for each line received.

The second line of each line pair may be interpolated as is known in the art or it may be an exact replica of the first line. An example of a progressively scanned receiver, wherein the added video lines are replicas of the original scan lines, is described in U.S. Pat. No. 4,415,931 entitled Television Display with Doubled Horizontal Lines which issued Nov. 15, 1983 to R. A. Dischert. A doubly scanned receiver in which the additional scan lines are obtained by interpolation from the original scan lines is described by K. H. Powers in U.S. Pat. No. 4,400,719 entitled Television Display System with Reduced Line-Scan Artifacts which issued Aug. 23, 1983. The arrangements disclosed in these patents are incorporated by reference herein.

Of importance to the present invention is the determination of the exact starting point for each displayed line and this is controlled in accordance with the invention by means of the address generators 28 and 30 in progressive scan processors 20 and 22, respectively. Address generators 28 and 30 each include circuits for storing the highest address written into respective ones of memories 24 and 26 during a memory write operation and for controlling (limiting) the highest address read from the memory during at least one subsequent read operation in accordance with the stored address. This feature of the invention may be realized by resetting an address counter in the address generator whenever the current address during a memory read operation equals the highest address of the previous memory write operation. By this means, it is assured that the memory read operation "tracks", in a manner of speaking, variations in the number of pixels stored during the immediately preceding memory write operation. Since the counter modulo (its counting range) continuously adapts to the number of pixels per line of the incoming video signal, the pixels displayed on unit 18 will have uniform horizontal spacing and vertical alignment regardless of whether or not the incoming video signal conforms to a specific broadcast standard ratio of color subcarrier frequency and horizontal line rate ($f_{sc}$/FH).

Figure 2:
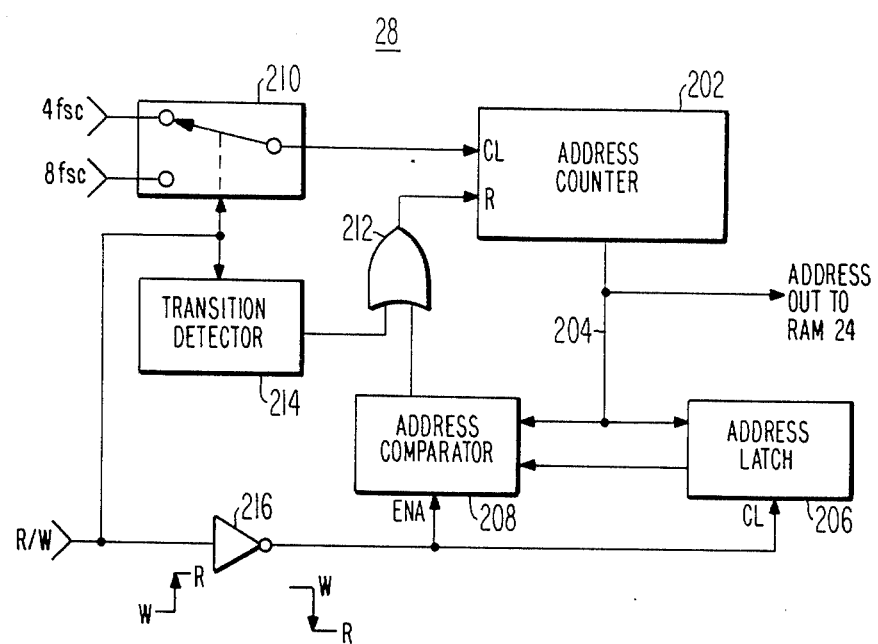
FIG. 2 is a block diagram illustrating certain details of an address generator suitable for use in the receiver of FIG. 1.
Figure 3:
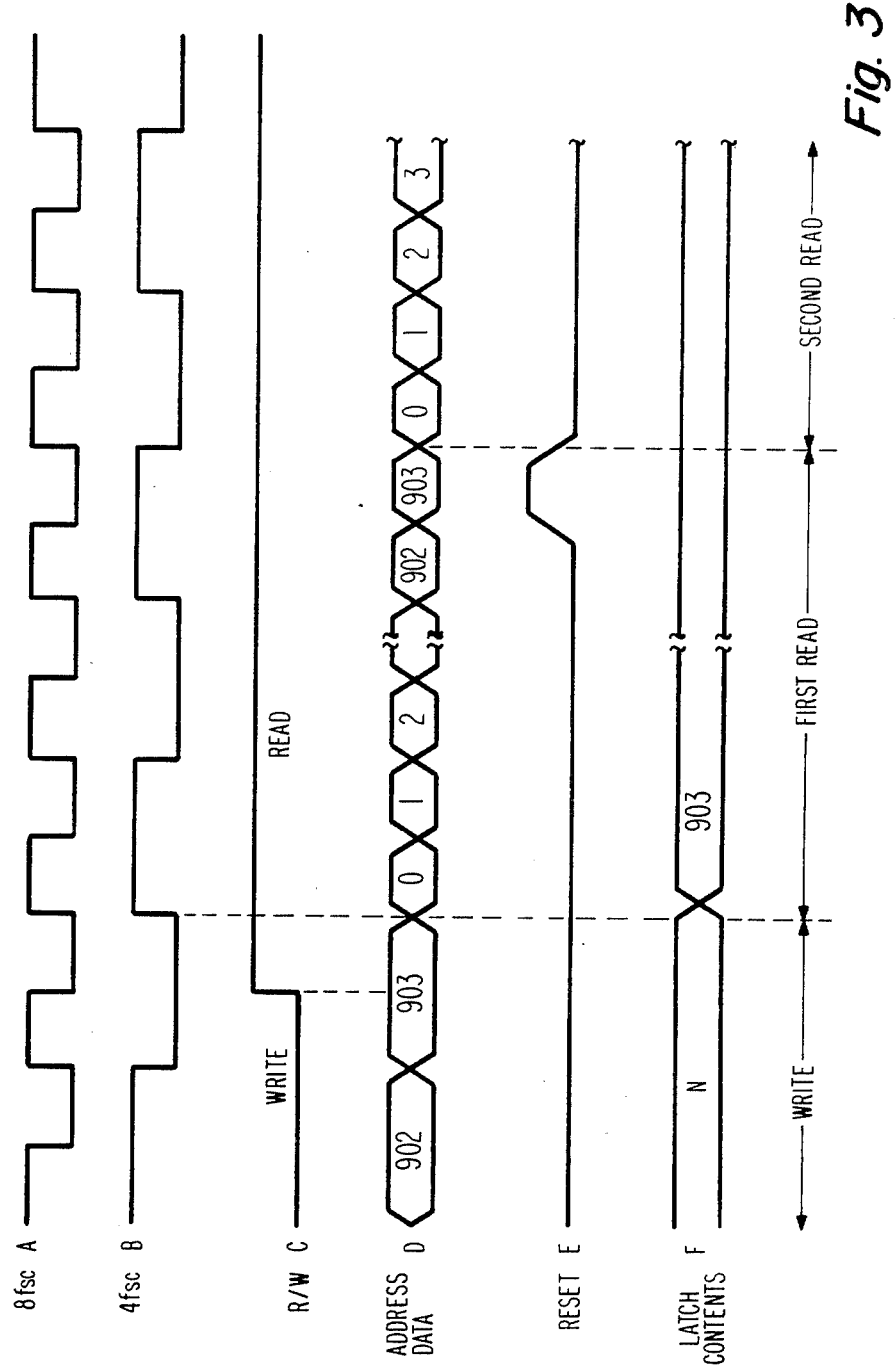
FIG. 3 is a timing diagram illustrating certain aspects of operation of the address generator of FIG. 2.

FIG. 2 and the associated waveform diagram of FIG. 3 provides a more detailed illustration of the variable modulo addressing feature of the invention. The address generator of FIG. 2 is exemplary of generators 28 or 30 in FIG. 1. The read/write control signal should be inverted for one of the generators (as shown in processor 22 in FIG. 1) since in the overall system the RAM's are written and read from alternately (i.e., one RAM is written while the other is being read).

Generator 28 (or 30) comprises a 10 bit address counter 202 having an output coupled via an address bus 204 to the address input of RAM 24 (FIG. 1). Address bus 204 is also coupled to an address latch 206 and to one input of an address comparator 208 the other input of which is coupled to the output of latch 206. Clock signals for counter 202 are applied to its clock input (CL) by means of a half-line rate (FH/2) controlled switch 210 which couples the 4 $f_{sc}$ and 8 $f_{sc}$ clock signals provided by timing unit 16 to terminal CL during alternate line intervals. More specifically, the control for switch 210 comprises the system read/write signal R/W. When signal R/W is high, RAM 24 is placed in a write mode and switch 210 supplies 4 $f_{sc}$ clock signals to address counter 202. Conversely, when signal R/W is low, RAM 24 is placed in a read mode and switch 210 supplies 8 $f_{sc}$ clock signal to counter 202.

Address counter 202 has a reset input (R) which is coupled via an OR gate 212 to the output of address comparator 208 and to the output of a transition detector 214. The input of detector 214 is coupled to receive the R/W control signal supplied to switch 210. Detector 214 supplies a reset pulse to counter 202 via OR gate 212 upon each transition of signal R/W. Since signal R/W is a half line-rate square wave derived from the horizontal synchronizing component (HS) of signal S1, counter 202 is reset at the beginning of each line of the video input signal S1.

It is the function of latch 206 and comparator 208 to provide an end-of-line indicator signal to reset address counter 202 during a read operation whenever the current address for RAM 24 equals the highest address previously stored during the immediately preceding memory write operation. There are thus two means for resetting the counter 202 to its starting address (e.g., zero). Detector 214 resets counter 202 at the start of every line of the video input signal S1. Comparator 208 resets counter 202 at the end of the first read operation of RAM 24 when the highest stored address is read to thereby initiate the start of the second read operation. Finally, during the second read operation, counter 202 is reset upon the occurrence of either the count reaching the stored value or upon the occurrence of a transition of the R/W signal which marks the beginning of the next write operation. To facilitate this operation, the timing of comparator 208 and latch 206 is controlled by the R/W signal which is inverted by an invertor 216 and applied to the clock input, CL, of latch 206 and to the enable input, ENA, of comparator 208. Latch 206 is responsive to negative transitions at its clock input and comparator 208 is enabled by a low level signal (logic zero) at its enable input. Accordingly, at the end of a write operation the negative transition of the inverted R/W signal causes latch 206 to store the highest address generated by counter 202 and enables comparator 208 which compares the present and previous addresses to reset counter 202 when the addresses are equal. This determines the end of the first read cycle and the beginning of the second read cycle.

FIG. 3 provides a specific example of operation of generator 28 (or 30) for the assumed conditions that sampling is provided at a 4 $f_{sc}$ rate and that the video signal S1 is "non-standard" in that the ratio $f_{sc}$/FH is such that there are 904 samples per line rather than 910 as would be the case for an NTSC standard signal. Waveforms A and B illustrate the 8 $f_{sc}$ and 4 $f_{sc}$ read and write clock waveforms, respectively. Waveform C is the read/write signal which is a symmetrical square wave of half the line rate of the video input signal S1. When this waveform is low, processor 20 is writing signal S2 in RAM 24 at the 4 $f_{sc}$ rate and processor 22 is reading data from RAM 26 at the 8 $f_{sc}$ rate for display or unit 18.

Assuming that the starting address is zero, the address of the last sample (No. 904) written during the memory write operation will be address 903. Waveform D represents the address data supplied to RAM 24 by generator 28. When the write-to-read transition of waveform C occurs the output of counter 202 will be address 903 for the assumed condition. This address (of the 904th pixel) is stored in latch 206 as indicated by waveform F. During the read operation the output of comparator 208 will go high, as shown by waveform E, when the current address (waveform D) equals the previously stored address (waveform F) thereby resetting counter 202 to zero. This starts the beginning of the second read operation exactly at the end of the last pixel stored during the write operation thereby ensuring that the second line displayed during a memory cycle is exactly aligned with the first line of the memory cycle. Since the starting point of the displayed video signal adapts on a line-by-line basis to changes in the number of pixels per-line, the progressive scan display system may be used with standard or non-standard signals without appearance of the undesirable visual artifacts previously described.

What is claimed is:

1. In a progressive scan video processor of the type having memory means for storing a video input signal supplied thereto during a first line interval thereof and for recovering the stored signal N-times during a subsequent line interval to provide a processed video output signal having a line rate N-times that of said video input signal, said memory means being coupled to address generator means for receiving read and write addresses therefrom, the improvement, comprising:

circuit means coupled to said generator means for storing the last address written in said memory means during a memory write operation and for controlling the starting time of at least one subsequent memory read operation in accordance with the stored address.

2. A video processor as recited in claim 1 further comprising second circuit means coupled to said address generator means for initializing said address generator means to a given starting address in response to a horizontal synchronizing component of said video input signal.

3. A video processor as recited in claim 1 wherein said circuit means comprises:
    (a) latch means coupled to receive and store said last address written in said memory means during said memory write operation;
    (b) comparator means coupled to input and output means of said latch means for providing an end-of-line indicator signal; and
    (c) coupling means for coupling said end-of-line indicator signal to an input of said address generator means for initializing said address generator means to a given starting address in response to said end-of-line indicator signal.

4. A progressive scan video display apparatus, comprising:
    (a) input means for receiving a video input signal to be displayed;
    (b) read/write memory means coupled to said input means for storing said video input signal during a first line interval thereof and for recovering the stored signal N-times during a subsequent line interval to provide a processed video signal having a line rate N-times that of said video input signal;
    (c) display means having a horizontal deflection rate N-times the line rate of said video input signal and coupled to said memory means for displaying said processed video signal recovered from said memory means;
    (d) memory address generator means coupled to said memory means for supplying write addresses thereto during said first line interval and for supplying read addresses thereto during said subsequent line interval; and
    (e) circuit means coupled to said generator means for storing the last address written in said memory means during a memory write operation and for controlling the starting time of at least one subsequent memory read operation in accordance with the stored address.

5. Video display apparatus as recited in claim 4 wherein:

said memory address generator means comprises address counter means having a reset input responsive to a reset signal supplied thereto for placing said counter means in a predetermined initial state corresponding to a given starting address of said memory means; and said circuit means comprises latch means coupled to said counter means for storing said last address written in said memory means during said memory write operation and comparator means coupled to input and output means of said latch means for detecting said starting time of said at least one subsequent memory read operation and supplying said reset signal to said address counter means to initiate the start of said at least one subsequent memory read operation.

* * * * *